(12) United States Patent
Franko, Sr.

(10) Patent No.: US 7,172,670 B2
(45) Date of Patent: **\*Feb. 6, 2007**

(54) SINGLE-PASS, IN-LINE PROCESS FOR MANUFACTURING MULTI-PART ARTICLES

(75) Inventor: Joseph D. Franko, Sr., Ham Lake, MN (US)

(73) Assignee: Quality Assured Enterprises, Inc., Hopkins, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/855,024

(22) Filed: May 26, 2004

(65) Prior Publication Data

US 2004/0211510 A1 Oct. 28, 2004

Related U.S. Application Data

(63) Continuation-in-part of application No. 10/313,693, filed on Dec. 6, 2002, now Pat. No. 6,761,792.

(51) Int. Cl.
B32B 37/00 (2006.01)

(52) U.S. Cl. .................. 156/256; 156/252; 156/267; 156/270; 156/247; 156/277; 156/257; 156/517; 156/519; 156/514

(58) Field of Classification Search ............... 156/256, 156/270, 252, 253, 267, 247, 277, 289, 250, 156/257, 510, 516, 517, 519, 269, 514; 283/81, 283/94, 98, 100, 101
See application file for complete search history.

(56) References Cited

U.S. PATENT DOCUMENTS

| | | | |
|---|---|---|---|
| 3,607,537 A | * | 9/1971 | Von Hofe et al. ........... 156/277 |
| 4,841,712 A | | 6/1989 | Roou |
| 5,403,636 A | | 4/1995 | Crum |
| 5,639,332 A | | 6/1997 | Instance |
| 5,829,789 A | | 11/1998 | Treleaven et al. |
| 5,975,575 A | | 11/1999 | Instance |
| 5,976,294 A | * | 11/1999 | Fagnant et al. ............. 156/192 |
| 6,027,598 A | | 2/2000 | Anderson |
| 6,159,327 A | * | 12/2000 | Forkert ........................ 156/264 |
| 6,207,001 B1 | * | 3/2001 | Steidinger et al. .......... 156/264 |
| 6,350,342 B1 | | 2/2002 | Steidinger et al. |
| 6,358,342 B1 | * | 3/2002 | Instance ....................... 156/64 |
| 6,576,315 B2 | * | 6/2003 | Treleaven et al. .......... 428/40.1 |
| 6,823,919 B2 | * | 11/2004 | Sasaki ......................... 156/517 |
| 2002/0084026 A1 | | 7/2002 | Matthews et al. |
| 2002/0192465 A1 | * | 12/2002 | Liu et al. ..................... 428/354 |
| 2003/0144121 A1 | | 7/2003 | Walsh et al. |

* cited by examiner

*Primary Examiner*—Linda Gray
(74) *Attorney, Agent, or Firm*—Nikolai & Mersereau, P.A.; C. G. Mersereau; Walter K. Roloff

(57) ABSTRACT

A single-pass, in-line process for creating multi-part articles by combining primary substrates in a first continuous web with discrete elements from a second continuous web which includes pre-cutting the second web to define, but not separate, discrete element portions and a waste portion, with the web remaining intact, joining the first and second webs in aligned relation in a manner which causes selected portions of the discrete element portions to adhere to selected portions of the primary substrates in the first web in a predetermined aligned registration to form multi-part articles and removing the waste portion of the second web from the combined web.

26 Claims, 12 Drawing Sheets

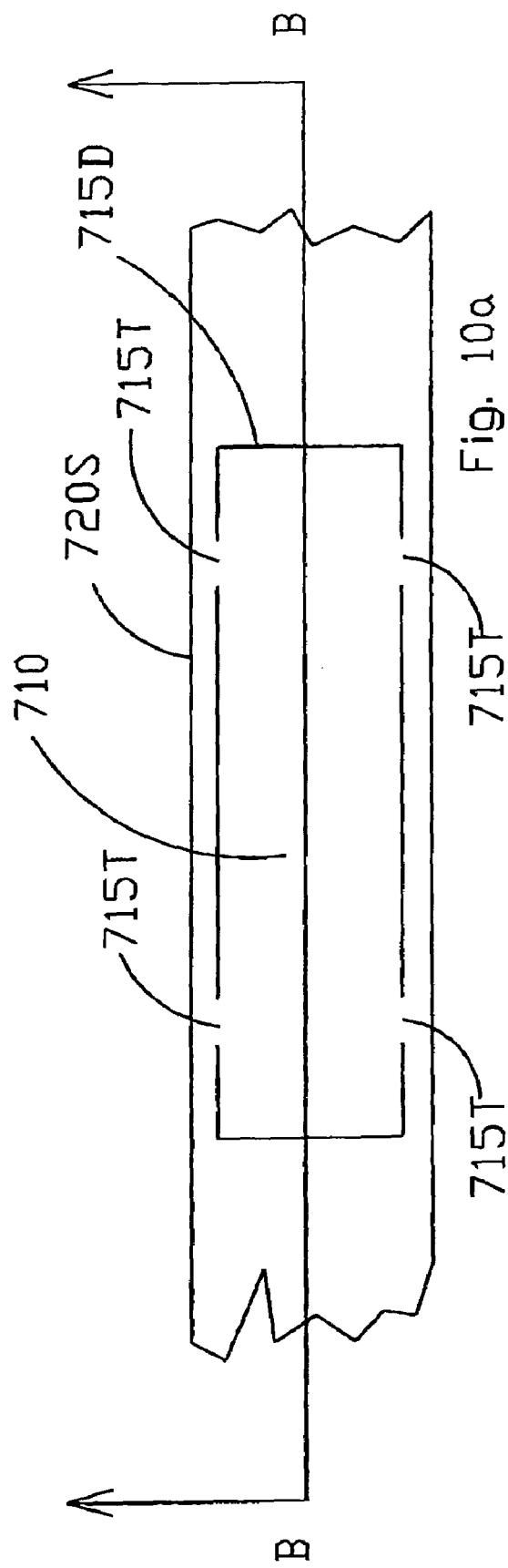
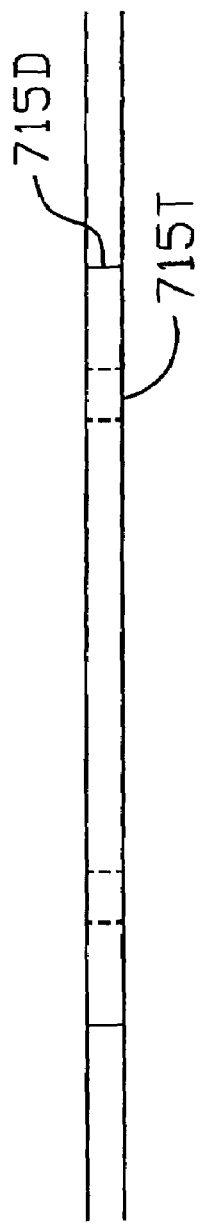
Fig. 10a
Fig. 10b

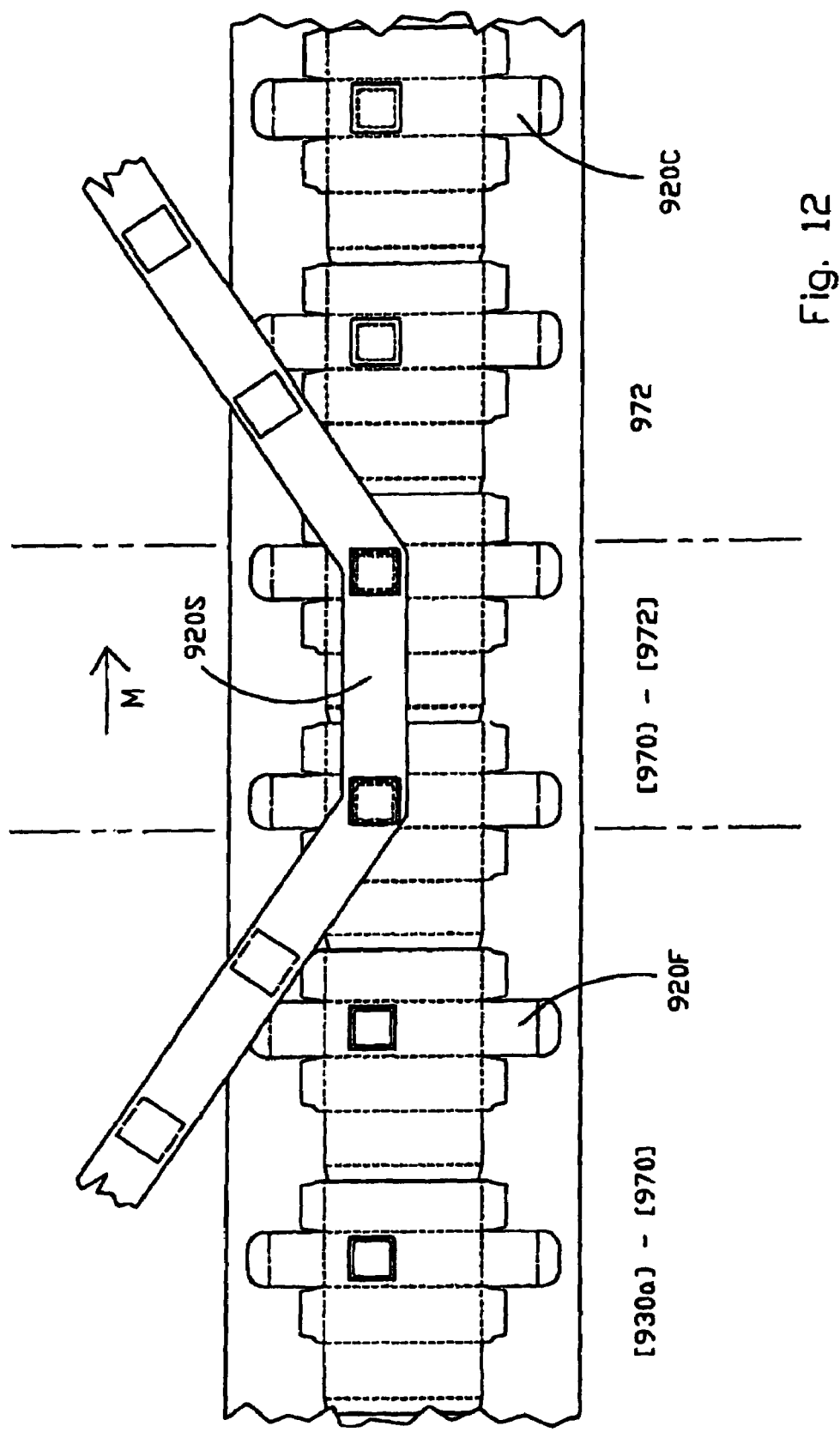

SINGLE-PASS, IN-LINE PROCESS FOR MANUFACTURING MULTI-PART ARTICLES

This application is a continuation-in-part of prior application Ser. No. 10/313,693 filed on Dec. 06, 2002, now U.S. Pat. No. 6,761,792 with an entirety thereof being deemed incorporated herein by reference.

BACKGROUND OF THE INVENTION

I. Field of the Invention

The present invention relates generally to the field of labeling and to in-line printing and converting processes. The present invention relates specifically to a single-pass, in-line process for (i) constructing multi-ply resealable labels that accommodate intermediate plies smaller in size than the overall label dimensions, and (ii) manufacturing discrete elements combined with primary substrates, such as film-covered windows within carton materials.

II. Background of the Invention

Multi-ply labels, variously referred to as "multi-layered", "extended text", "expanded content" or "booklet" labels, carry text on a plurality of surfaces and are useful for consumer products, particularly those sold in bottles, cans, cartons, and tubes, where it is desirable to present additional information to the consumer which cannot conveniently be contained on a single printed label surface. Particularly in view of the increasing amount of governmental regulation and labeling requirements, many consumer products contained in such packaging must carry additional information including detailed instructions for use, detailed listings of the contents, a variety of consumer product warnings, and provisions for multi-lingual information.

Multi-ply labels normally contain two or more layers or plies of label material hinged together adhesively along one margin, and close utilizing a pressure sensitive release-reseal system along the opposite margin. It is often desirable that one or more internal, middle or intermediate plies be added between an upper or top ply and a bottom or base ply. It is further advantageous if the intermediate plies can be hinged between the top ply and base plies yet not interfere with or be required to be part of a release-reseal closure system involving top and base plies. This can be accomplished by making internal or intermediate plies shorter than the top and base plies so that the free ends of the intermediate plies do not extend into the release-reseal margin area. In this way, intermediate plies are hinged like the pages of a book when a label is open, yet are confined within a resealed or closed label.

While the above is a desirable configuration or label construction for labels of a class having three or more plies, automation of an in-line, single pass process to mass produce such labels has been thwarted. One problem arises because the slightly smaller intermediate ply or plies must be sized separately and prior to any final sizing cut for the assembled labels. This problem, among others, has heretofore proved to be an impediment to mass production in-line, single pass automation.

One in-line process for multi-ply labels is illustrated and described in U.S. Patent Application Publication US 2002/0084026 A1 to Matthews et al., teaching the use of a pressure-sensitive adhesive overlaminate to hold two webs together. That in-line construction, however, results in a costly and unnecessarily complex multiple layer label.

Thus, it would present a distinct advantage if the process for making hinged multi-ply labels could be simplified and automated, particularly for those multi-ply labels designed to have one or more under-sized intermediate plies configured in resealable booklet-label form.

Additionally, in-line, continuous web processes are well known in the art for accurate, high volume production of cartons and other printed matter. Such in-line web processes, relative to earlier printing and converting techniques, have offered superior print-to-print and print-to-die registration, and other desirable effects. Heretofore, however, known in-line processes have been unable to provide for the manufacturing of items which feature discrete elements combined with primary substrates, such as film-covered windows with a carton material.

So-called "pick-and-place" methods have, therefore, been typically used for these constructions. In a pick-and-place operation, discrete elements are cut to size off-line and supplied separately, in a magazine, to a printing and converting press or to packaging equipment. The discrete elements would then be sequentially ejected from the magazine and adhered onto a passing base web as known to those in the art. As also known to those in the art, analogous to the pick-and place equipment, relative to film for carton windows, is off-line "windowing" equipment. Pick-and-place methods along with windowing equipment, however, suffer several drawbacks. Chief among these is a failure to maintain proper registration or holding of tolerances between items being combined. Such operations are also relatively slow as compared to true in-line processes, because of a need for rather precise placement of the separately created discrete elements on the passing base web. Further, reliability of discrete element placement is subject to mechanical problems that may arise in the equipment, and to inadvertently empty supply magazines.

Therefore, there also exists a need for a single-pass, in-line process for manufacturing discrete elements combined with primary substrates, which overcomes the significant drawbacks of known pick-and-place, windowing, and similar techniques.

SUMMARY OF THE INVENTION

In accordance with the present invention, there is provided a process for manufacturing resealable multi-ply labels that includes a first or base ply having an under side and an upper side and typically an amount of a pressure sensitive adhesive (PSA) material (defined below) on the under side to attach the label to an object, normally a container of interest to be labeled. A top ply is provided having an upper side and an under side and the upper side of the base ply and the under side of the top ply are designed to be joined together permanently along a first or hinge edge or hinge strip, preferably by an amount of a permanent adhesive (PA) material (defined below), which is not pressure sensitive and which thereby forms a permanent hinge. Of course, in some applications, hinges may be conveniently formed using a pressure sensitive adhesive material (PSA) (also defined below).

As will become apparent, an important aspect of the process of the invention involves in-line, single pass inclusion of additional middle or intermediate plies which are attached between the top ply and the base ply. Intermediate plies may be attached using (i) a portion of the hinge strip fastening the base ply to the top ply, or (ii) using multiple hinges, one provided between each of the layers or plies in sandwich fashion.

The upper side of the base ply and the under side of the top ply are also releasably, resealably, joined along an opposite or second edge or along an outer release-reseal margin opposite the hinge or at one or more release-reseal strips spaced from a central hinge strip (depending on the label configuration). A dual layer release-reseal system is used which includes a layer of pressure sensitive adhesive material and an abutting layer (top/bottom) of a release coating such that the plies can be separated and resealed at a juncture therebetween.

One aspect of the present invention relates to the in-line, single pass manufacture of such labels, particularly those having middle or intermediate plies. More particularly, the present invention relates to such manufacturing of labels having one or more intermediate plies that are of a size different from that of the base and top plies or the overall label size. Most notably, the present invention accomplishes simplified in-line, single pass manufacture of multi-ply labels in which one or more undersized (shorter) intermediate plies are included within a booklet label. The labels are preferably processed continuously using multi-unit (modular) in-line narrow or wide web printing and converting platform presses selectively capable of providing a variable number of printing and converting stations. This includes stations for the application and drying of pigmented inks, coatings and adhesives of different types and stations accomplishing converting processes such as unwinding, turning, die cutting, joining and re-winding.

The manufacturing process may be carried out by using multiple continuous webs, i.e., one web per ply, using a single continuous web, or some combination thereof. In any event, the process enables the continuous production of multi-ply labels having intermediate or middle plies of smaller size, particularly shorter than those of the top and base plies. This is accomplished in one preferred embodiment by providing a web die cutting step prior to a web joining or ply assembly step in the case of a multi-web system, in which, more importantly, the die cutting step is one that does not disturb web integrity. In another preferred process embodiment, a "window"-creating die cutting step is provided in a single web label generating system which removes a portion or "window" of unwanted material from intermediate plies to accomplish size reduction.

Another aspect of the present invention is to provide a single-pass, in-line process for producing optimally smaller discrete elements combined with primary substrates, which maintains proper registration and tolerances. The present invention also provides a single-pass, in-line process for manufacturing discrete elements combined with primary substrates, which operates at a relatively high speed. The single-pass, in-line process embodiment for manufacturing discrete elements combined with primary substrates provided by the present invention accurately and reliably combines discrete elements with primary substrates at relatively high speed.

Additionally therefore, in accordance with an important aspect of the present invention, there is provided a single pass, in-line process for producing items that include discrete elements adhesively combined with primary substrates. In an exemplary embodiment, the process begins by providing a first web, having front and back surfaces, which defines a source material for primary substrates. A second web is provided, having front and back surfaces, which defines a source material for discrete elements. The second web is selectively cut to define dimensions for discrete element portions and a waste portion therewithin, the web remaining intact. An adhesive is applied to one of the webs, in a position corresponding to selected portions of the discrete element portions defined in the second web. The first and second webs are then joined in aligned relation by the adhesive to create a combined web. The waste portion is then stripped from the second web, as a waste matrix from the combined web. The stripping away of the waste portion thereby leaves the discrete elements adhered to the primary substrates of the first web, securely by way of the adhesive and accurately in-register. The combined web, carrying the discrete elements (i) in register with and (ii) secured to identified, uncut primary substrates, is then cut in accordance with the desired shape of the primary substrate to separate multi-part finished articles.

Like the aforementioned process embodiment for manufacturing labels, the present process embodiment accomplishes simplified, accurate, in-line, single pass combination of generally smaller discrete elements with primary substrates to produce other forms of multi-part articles. Again, as mentioned elsewhere relative to labels, the manufacturing is preferably accomplished by way of multi-unit (modular) in-line narrow or wide web printing and converting platform presses selectively capable of providing a variable number of printing and converting stations. This manufacturing process embodiment, like that for labels, is preferably carried out by using multiple continuous roll-fed webs, i.e., one web per material in a finished product. The process embodiment includes, in one preferred arrangement, providing a web die cutting step prior to a web joining step; the die cutting step, importantly, does not disturb web integrity.

BRIEF DESCRIPTION OF THE DRAWINGS

In the drawings wherein like numerals are utilized to designate like parts throughout the same:

FIG. 10a is an illustration of a fragment of a second web from the process of FIG. 9, showing a die-cut defined discrete element, greatly enlarged;

FIG. 10b is a cross-sectional view of the second web of FIG. 10a taken along line B—B;

FIG. 12 is a schematic plan view illustrating web combination and waste matrix removal.

DETAILED DESCRIPTION OF THE INVENTION

Figure 1:
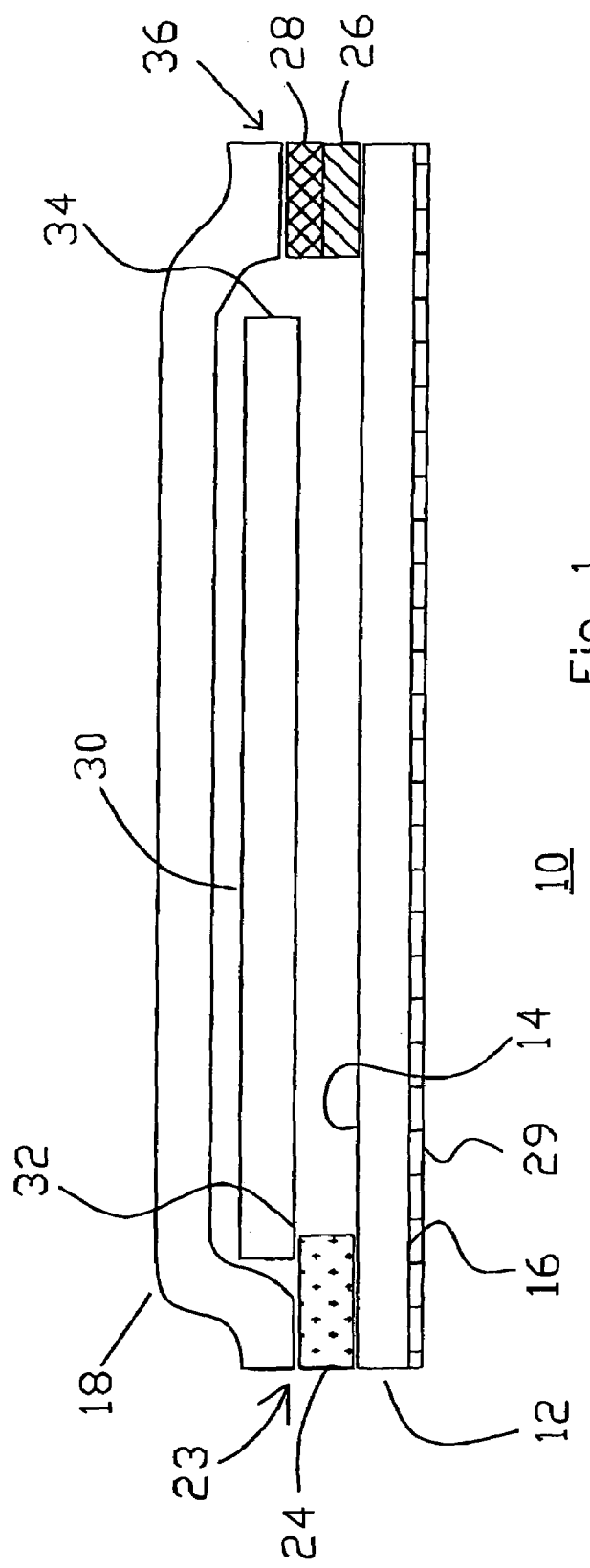
FIG. 1 is a cross-sectional view of an embodiment of a multi-ply label including an intermediate or middle ply suitable for manufacture by the process of the present invention.

In regard to the construction of the labels in accordance with the process of the present invention, certain criteria regarding the construction of the labels will be described. Those skilled in the art will also recognize that the processes described herein are presented as examples and are not intended to be limiting with regard to the scope of the invention in any way.

As has been indicated, in the construction of the labels using the process of the invention, two distinct categories or types of adhesive materials may be employed in the labels, namely, "permanent" adhesive (PA) materials and "pressure-sensitive" adhesive (PSA) materials. It is to be particularly appreciated that, as used herein, a "permanent" adhesive is one that undergoes a phase change and is a tack-free solid in the cured or final adhesive state, in bonding plies together. The class known as "permanent" adhesives may be further defined by a universally accepted reference text, *The Concise Encyclopedia of Polymer Science and Engineering* (New York, 1990.), which states, at page 35, with respect to permanent adhesives, the distinguishing feature that "Eventually, the adhesive must undergo a phase change, i.e., by cooling, solvent evaporation or reaction, to a solid in order for the joint to acquire the necessary strength to resist shearing forces."

Examples include hot melt adhesives, solvent-based adhesives, water-based adhesives, and UV- (ultraviolet) and EB- (electron beam) curable adhesives.

The class of adhesives known as "pressure-sensitive" adhesives (PSA) is contrasted as an exception to the above in the next sentence of the above-mentioned reference publication which reads, "A notable exception is the category of pressure-sensitive adhesives, where no phase change occurs." This also describes the term "pressure sensitive" as used herein. These materials remain tacky. Adhesion may be modified (reduced) by detackifying overlayers but the material does not solidify.

The in-line, single pass process variously embodied in the present invention, however, will operate successfully with either type of adhesive desired and does not limit label, or other product, construction from that standpoint. Within a class, preference of one such adhesive over another particularly will depend upon a drying or curing system of a given label manufacturing press, along with materials composition and compatibility considerations. In addition, in a dual layer release-reseal system, coatings abutting in the assembled label may be applied to the corresponding plies in either order, either separately, one on each ply or together as a combination on one of the plies. Thus, for example, the pressure sensitive adhesive may be applied to the upper side of the base ply or to the under side of the top ply and the release coating may be applied on the whole of the opposite facing surface exclusive of the hinge area or a lesser area down to just as much of that surface as is covered by the pressure sensitive adhesive. The pressure sensitive adhesive also may be applied in an intermittent pattern along the opposite edge and also along the remaining opposed side edges, or in any other pattern if desired.

The release coating may be a varnish, lacquer, or any other coating which accomplishes the effect of a release medium and allows the pressure sensitive adhesive to adhere to the ply only lightly so that it may be peeled back or released and resealed. Additional plies may be added as required.

Figure 2:
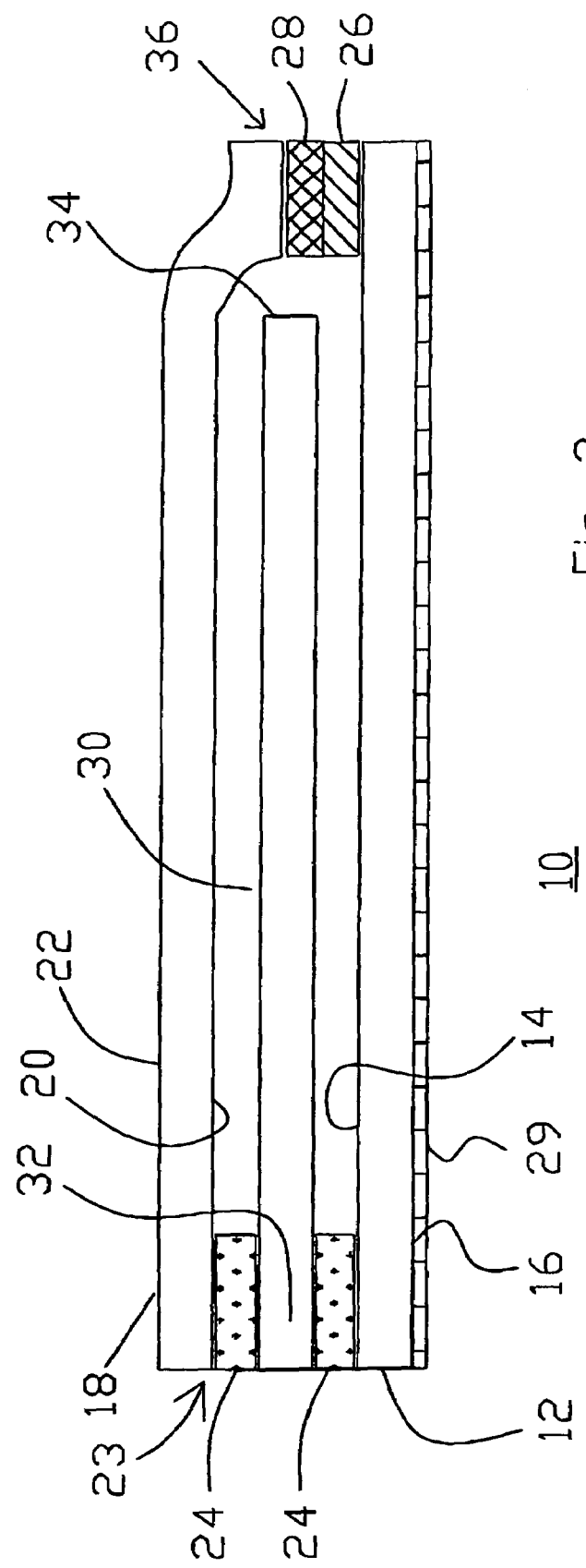
FIG. 2 depicts an alternative construction for the embodiment of FIG. 1 utilizing consecutive or stacked hinges in a sandwich-type arrangement.

FIGS. 1 and 2 show side or cross-sectional views of a resealable, multi-ply label 10 having a first or base ply 12 having an upper side 14 and an under side 16. Label 10 includes a top ply 18 having an under side 20 and an upper side 22.

The top ply 18 is joined to the first or base ply 12 along a strip that is normally a hinge margin or edge 23 preferably using a permanent adhesive material 24 to form a binding or hinge. The adhesive material 24 is designed to cause permanent adhesion so that the top ply 18 resists unintentional peeling away and removal from label 10. Pressure sensitive adhesives may also be used in the hinged construction of such multi-ply labels in accordance with the process of the present invention.

A middle or intermediate ply 30 is shown between base ply 12 and top ply 18. Ply 30 is also hinged by the hinge adhesive material 24 along one edge at 32 and has free sides and a free end 34. End 34 terminates before reaching the pressure sensitive adhesive 28 of the release-reseal system so that it is "captured" within the label 10 when the top ply 18 is held closed by the release-reseal system.

The plies 12, 18 and 30 may be made of any suitable material that meets the physical and chemical compatibility requirements, along with desired aesthetic attributes and cost considerations, of a particular label. It is to be understood that where necessary, surfaces of the plies to be printed may receive one or more additional depositions of material to adjust the receptiveness to printing materials. Thus, an array of papers, plastics, and related materials may variously be employed for the plies, the surfaces of which may be adjusted as needed by those skilled in the art.

As seen in FIGS. 1 and 2, a portion of the upper side 14 of the base ply 12 is provided with a layer of release coating 26 which may cover the entire area of the upper side 14 exclusive of regions having hinge adhesive coating 24 in "zone coat fashion" or some lesser amount as shown in FIGS. 1 and 2. As used herein, "layer" is intended to include any coating applied by a suitable deposition technique. The layer of release coating 26 is typically a varnish, lacquer, ink, or other coating that inhibits adhesions. A layer of pressure sensitive adhesive is shown at 28 which, in conjunction with the release coating 26 enables release and resealing of the upper ply 18, and may be characterized, in combination, as a "release-reseal system". A pattern of the pressure sensitive adhesive material in the release-reseal system may be in the form of a continuous, or a discontinuous or intermittent pattern, it only being necessary that the pattern of the pressure sensitive adhesive be substantially aligned with the release coating when the plies are sealed and that it provide sufficient tack to prevent unaided or unintentional opening of the label as may occur, for example, in a product labeling assembly line or on a retail shelf.

In the embodiment of FIG. 2, base ply 12 is joined to intermediate or middle ply 30, as is middle ply 30 to top ply 18 along a strip that is a hinge margin or edge using adhesive material 24 to form a binding, i.e., a stacked or consecutive pair of full hinges at 32.

Adhesive material 24 is preferred that cures to a tack-free state and creates permanent hinges so that intermediate ply 30 resists unintentional peeling away and removal from label 10. Top ply 18 is permanently hinged by hinge adhesive material 24 to middle ply 30. It can be seen, therefore, that this construction comprises an overall "adhesive sandwich" of alternating plies and adhesive materials at the hinge margin or hinge edge. It is to be particularly appreciated that such a construction, if done utilizing pressure-sensitive adhesive hinge materials, almost without exception, will result in "adhesive ooze" and many problems attendant therewith in dispensing, application, and use of label 10.

As described relative to the embodiment of FIG. 1, intermediate ply 30 in FIG. 2 also has free sides and a free end 34, which terminates short of the pressure-sensitive adhesive of the release-reseal system as was the case with the embodiment of FIG. 1. The combination of a layer of pressure-sensitive adhesive material 28 and a layer of release coating 26 (in any order) forms a "release-reseal system" between plies 12 and 18. As illustrated, a portion of upper side 14 of base ply 12 is provided with a layer of release coating 26 which may cover an entire area of upper side 14, exclusive of regions having hinge adhesive material 24, or some lesser amount.

As can be seen in the figures, the release-reseal system may be preferably limited to a strip in the vicinity of a second edge as at 36 which is opposite the hinge margin or hinge edge or strip 23. Of course, the release-reseal system requires only that the release coating 26 be substantially aligned with the pressure sensitive adhesive 28 on the opposed surface of the adjacent ply.

Any of the labels may be provided, if desired, with an additional layer of adhesive 29 on the under side of the base ply 12, to attach the label to an object of interest to be labeled such as, for example, a bottle of a medicinal preparation or other health or beauty aid product. The label may be conveniently stored, delivered, and dispensed from a release liner (not shown) to protect the attachment surface.

Figure 3:
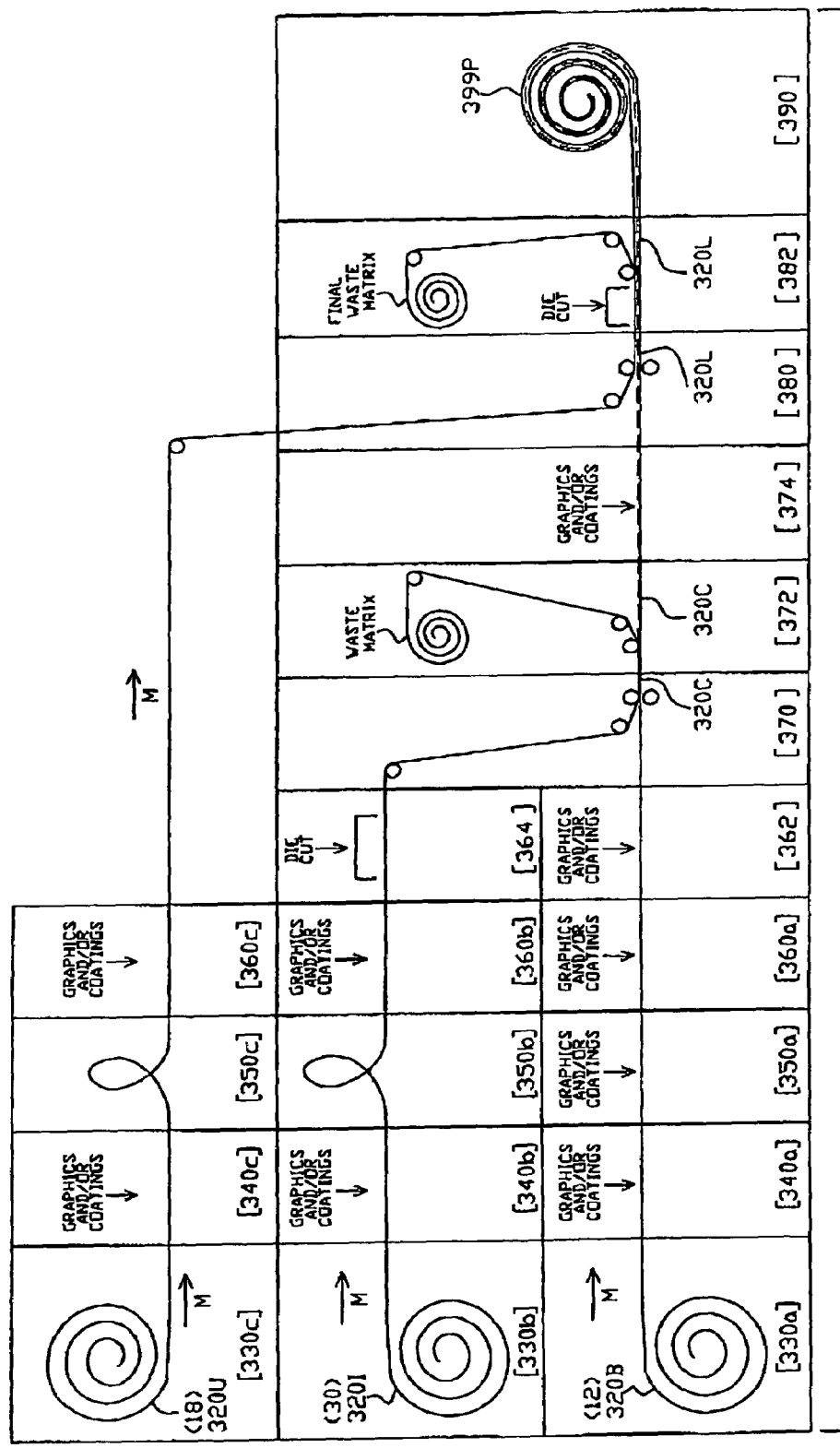
FIG. 3 is a schematic diagram of one preferred method of manufacturing labels according to the present invention.

Directing attention now to FIG. 3, there is depicted in schematic fashion an example of an in-line or modular web press manufacturing installation, generally 300, including multi-unit in-line printing and converting press 310, for mass or continuous production of, for example, the aforedescribed labels of FIGS. 1–2. As seen in the FIG., the converting press 310 as depicted is configured to process three webs 320U, 320I and 320B respectively, which carry the top, intermediate (or middle), and base plies of a label of interest.

Figure 6:
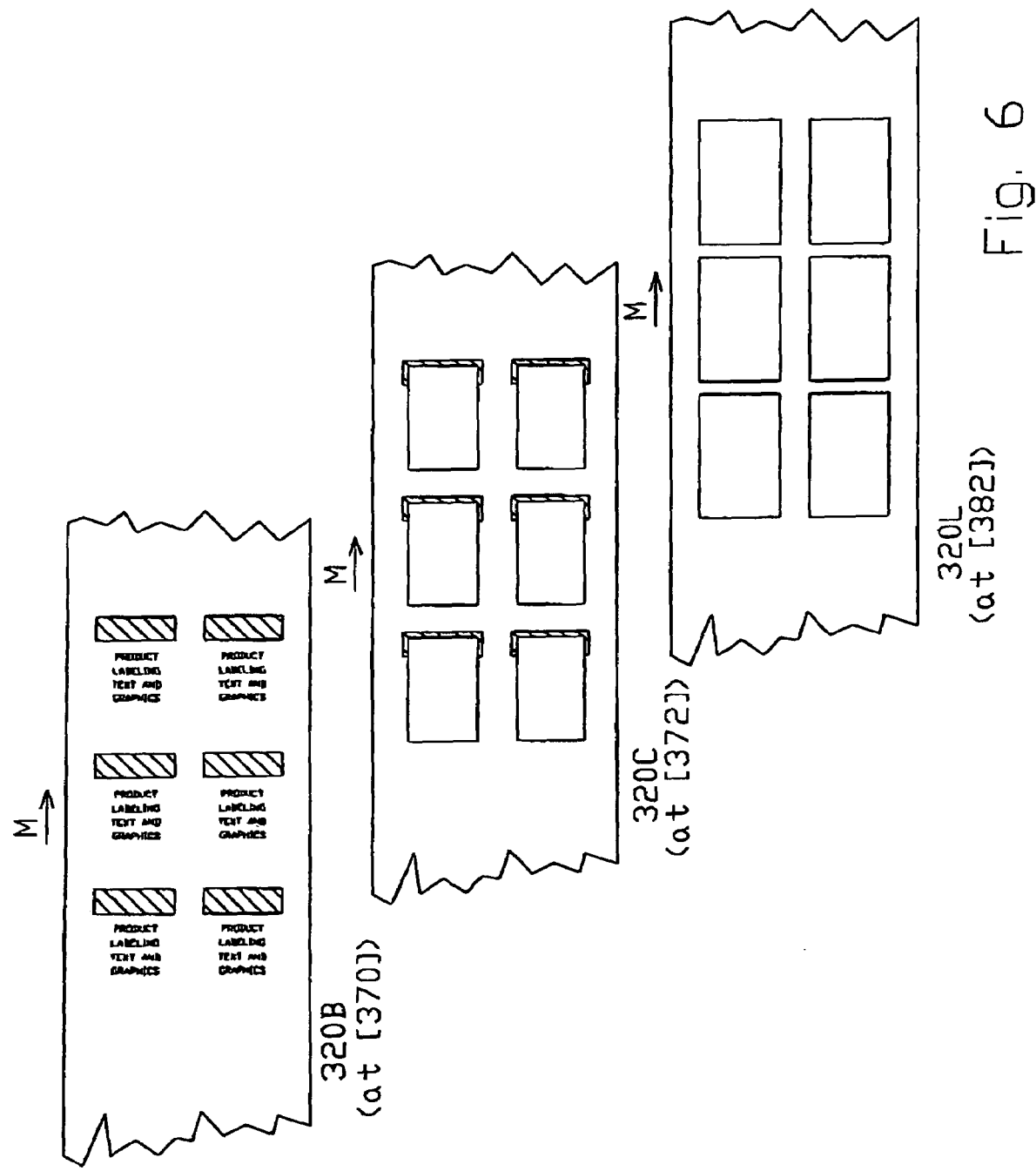
FIG. 6 is an illustration of progressive views of an enlarged fragment of an exemplary web of labels created in accordance with the method of FIG. 3.

Multi-unit press 310 of installation 300 includes (i) unwind units 330a, 330b, and 330c, (ii) first printing units 340a, 340b, and 340c, (iii) web turning units 350b and 350c, (iv) second printing units 360a, 360b, and 360c, (v) release-reseal system unit 362, (vi) first die cutting unit 364, (vii) first nip roller web joining unit 370, (viii) waste matrix removal unit 372, (ix) downstream printing unit 374, (x) second nip roller web joining unit 380, (xi) second die cutting and waste matrix removal unit 382, and (xii) final re-wind unit 390, as will now each be further described in construction of, for example, a web of labels as shown in FIG. 6.

It is to be understood that press 310 may take many forms and may be made selectively capable of providing a variable number of printing and converting stations for application and drying of pigmented inks, coatings, and adhesives, and for converting processes such as unwinding, turning, die cutting, joining and re-winding. Multi-unit presses of this class are preferred for producing labels of the present invention and are known in the art to include a variety of modular, interchangeable units. Specifically, any of the exemplary units 340–382 may be arranged in any desired order and, of course, units may also be added or removed from installation 300 as desired or required by process variations. As understood by those skilled in the printing arts, multi-unit press 310 may be any suitable narrow- or wide-web platform press such as a flexographic, letterpress, gravure, screen, or offset press. Such presses are commercially available from, for example, Comco International of Milford, Ohio, or Mark Andy Inc. of St. Louis, Mo. It will also be appreciated that as used herein throughout and in the drawings, the terms "printing", "graphics" and "coatings" include, but are not limited to, various printing media, adhesives, hot melts, varnishes, inks, release coatings, hot and cold foil stamping processes, etc.

With continued reference to FIG. 3, and as an example of construction of three-ply labels 10 as depicted in FIG. 1, top web 320U (corresponding to top ply 18 in FIG. 1) is supplied in a conventional roll form to press 310 at unwind unit 330c, and in a lengthwise machine direction M thereto. Intermediate web 320I (middle ply 30 in FIG. 1) and base web 320B (base ply 12 in FIG. 1) are also preferably supplied in conventional roll forms to press 310 at unwind units 330b and 330a, respectively, also in lengthwise machine direction M. Webs 320U, 320I, and 320B are any suitable in-line web-like materials. As used herein, "web-like materials" denotes any suitable label ply material or combination hereof, including but not limited to paper, film, polypropylene, polyethylene, polyester, polyvinylchloride, polystyrene, foil, and ethylene vinyl acetate, whether clear or opaque. Further, base web 320B may comprise a conventional so-called "pressure sensitive laminate".

Unwind units 330a–c pass webs 320B, I, and U, respectively, to first printing units 340a–c, where selected graphics may be printed on the webs. Webs 320I and 320U then advance to optional web turning units 350b–c, respectively, where the webs may be turned for printing on their reverse sides if desired by way of any suitable turn-bar or like technique as known in the art. If so optionally turned, webs 320I and 320U then advance to second printing units 360b–c, respectively, where selected graphics may be printed on the reverse sides thereof.

After passing from first printing unit 340a, web 320B advances to unit 350a for selective application of a release coating as at 26 in FIG. 1, and to unit 360a for selective application of a permanent hinge adhesive coating as at 24 in FIG. 1. With release and adhesive coatings applied in a desired pattern, web 320B then passes on to unit 362 where a pressure-sensitive adhesive-based release-reseal system is created by adding PSA at 28.

Figure 4A:
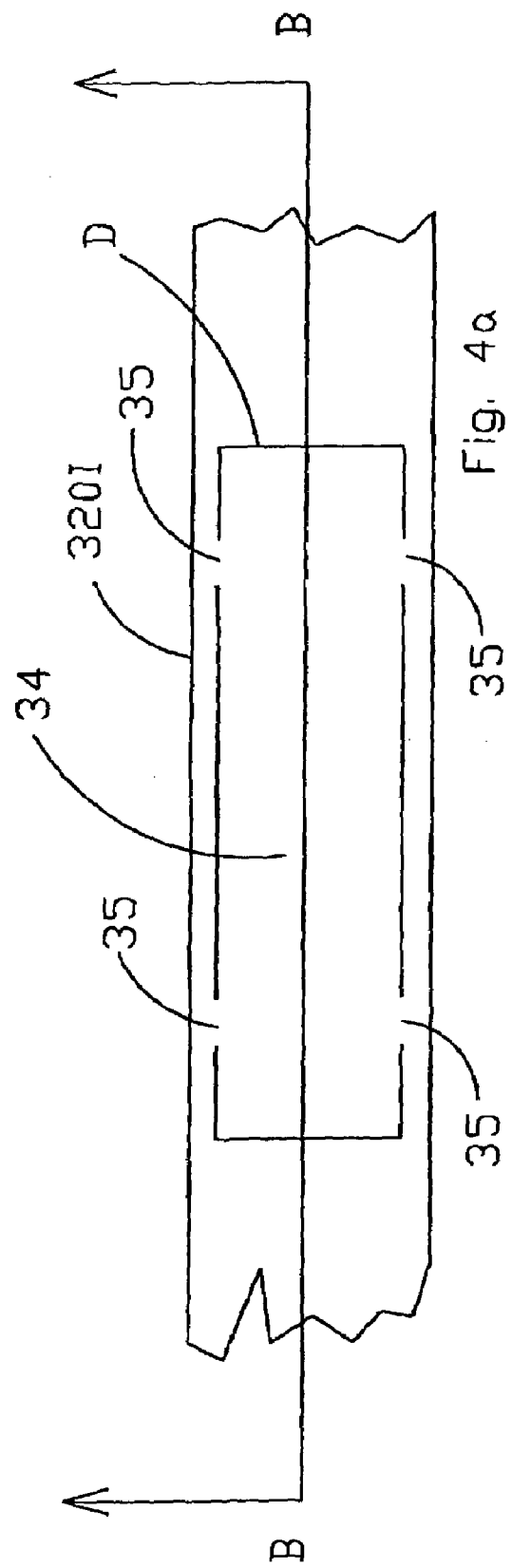
FIG. 4a is an illustration of a fragment of an intermediate ply-carrying web from the process of FIG. 3 greatly enlarged.
Figure 4B:
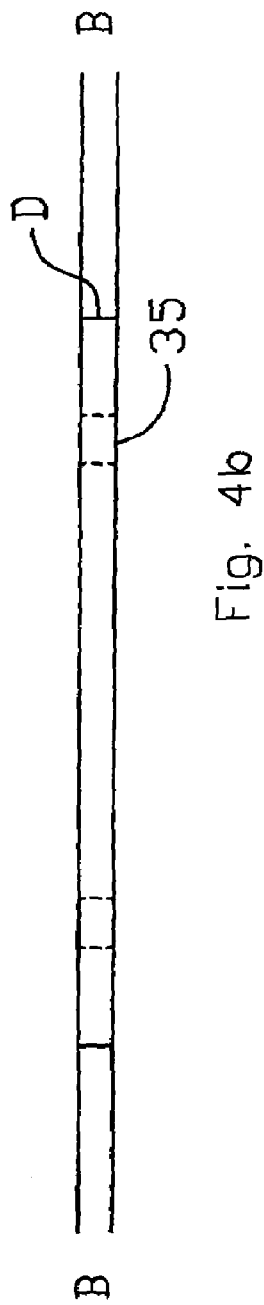
FIG. 4b is a cross-sectional view of the label web of FIG. 4a taken along line B—B.

An important advance in the process of the invention involves the continuous on-web sizing of each middle or intermediate ply as web 320I is continually processed concurrently with web 320B. From second printing unit 360b, web 320I advances to a first die cutting unit 364 where web 320I is selectively die cut on the web to provide a dimension for middle ply 30 that, as indicated, is different from a final overall or outer label dimension, web 320I remaining intact. Critical print-to-print and cut-to-cut registration is maintained between the concurrently processed webs, and ultimately the finished product plies, because web 320I is allowed to remain intact after die cutting at unit 364, the cut ply being held intact by uncut tabs such as those shown at 35 in FIGS. 4a–b. The die cut area in the ply is denoted as "D" in FIGS. 4a–b.

Webs 320B and 320I then advance to first nip roller web joining unit 370 where they are adhesively joined or "married" in aligned print-to-print registration to form a combined web 320C. Such marrying of webs 320B and I may be accomplished by, for example, any suitable nip roller or web joining technique as known in the art. Combined web 320C then passes to waste matrix removal unit 372 where a waste matrix from an unused portion of web 320I, resulting from operation of first die cutting unit 364, is removed in any well-known waste matrix removal or "stripping" operation. The stripping operation, as will be appreciated by those skilled in the art, results in creation of individual, discrete label elements on the combined web 320C.

After the stripping process, combined web 320C carrying individual, discrete label elements passes to unit 374, where hinge adhesive and/or graphics are applied to the combined web 320C in a portion remote from the release-reseal system. Web 320C then advances to second nip roller web joining unit 380, where web 320U is also introduced in print-to-print registration with its counterpart web 320C to form an overall label structure web 320L. Label structure web 320L is then passed to second die cutting unit 382, where the web is die cut (to produce final label dimensions) and a final waste matrix is stripped away. In this manner, individual finished labels are provided in label structure web 320L having desired final dimensions.

Label structure web 320L then passes to final re-wind unit 390 for re-winding into a finished press roll 399P carrying individual labels (as shown, for example, in FIG. 6). Alternatively, web 320L may be "sheeted" for use with various other container decorating methods, as is known in the art.

As indicated above, it will be appreciated and understood that the first die cutting step and reliable operation of first die cutting unit 364 are critical, to accurate creation in web 320I of a middle ply 30 (FIGS. 1–2) having dimensions different than plies 12 and 18 as mentioned above. This die cutting operation at unit 364, of course, assures that ply 30 resulting from web 320I does not have die cut dimensions equivalent to those overall final dimensions provided to individual labels in label structure web 320L. Further, it is to be particularly appreciated that the technique of leaving web 320I intact immediately after the first die cutting operation creates a selected waste matrix in the manufacturing method of the present invention that advantageously enables a completely in-line, single pass process to succeed. It is to be noted that in-line processes must maintain print-to-print and cut-to-cut registration, which is imperative when providing generally large amounts of information on limited surface areas.

Although three webs are depicted in FIG. 3 (320U, 320I, and 320B) various plow folding and slitting techniques could allow a lesser number of webs to be used in this process; commensurately, however, finished product yields would be decreased. Additionally, several "pages" of information could effectively be provided in, for example, web 320I by way of one or more plow folding operations (not illustrated) before die cutting at unit 364. Further, a portion of web 320I could be removed by "slugging" or another suitable technique, prior to marrying the webs (370).

Of course, the process described herein could employ and join additional webs providing additional label plies in the manner of processing described in the embodiments described herein as will be evident to those skilled in the art.

Figure 5:
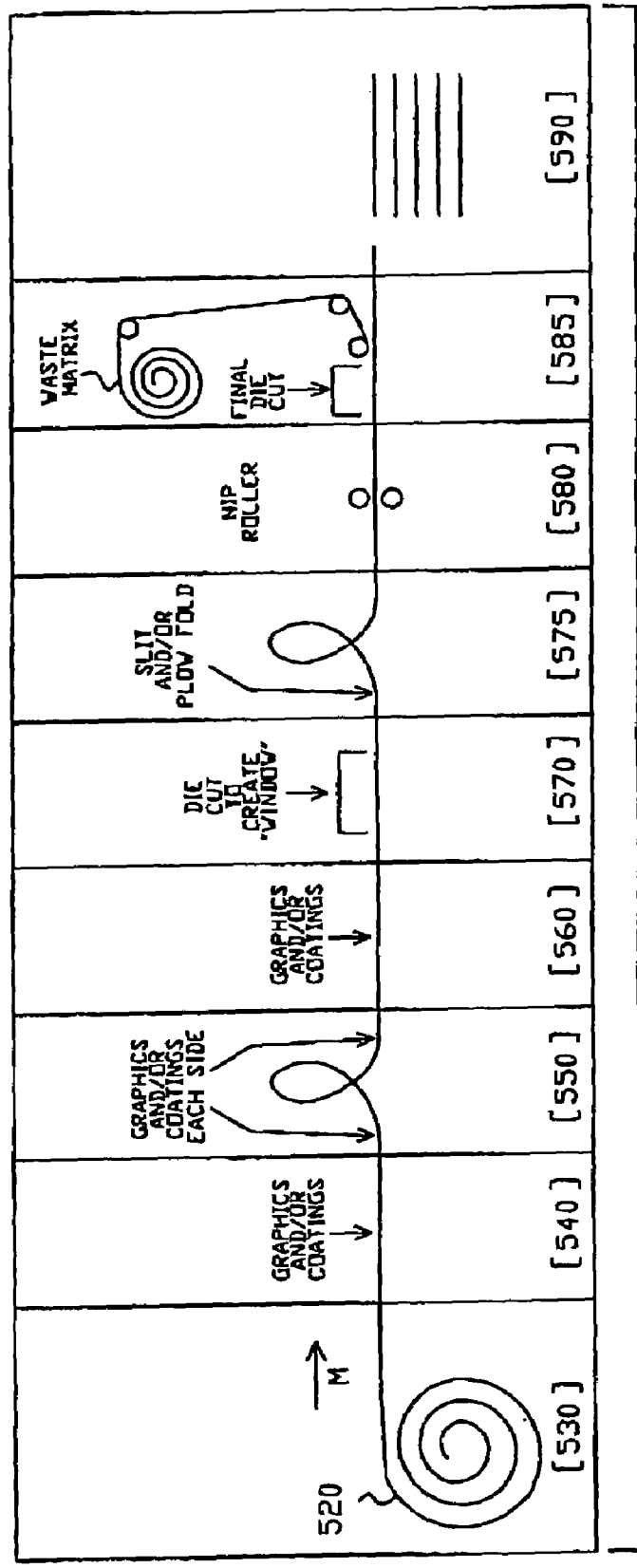
FIG. 5 is a schematic diagram of an alternate preferred method of manufacturing labels according to the present invention using a single web.

Turning, now, to FIG. 5, a technique for manufacturing the labels of the present invention using a single web is schematically depicted. Therein, an exemplary in-line single web press manufacturing installation 500 includes multi-unit modular in-line printing and converting press 510.

Multi-unit press 510 of installation 500 includes (i) unwind unit 530, (ii) multi-graphic printing unit 540, (iii) combination graphic, varnish, and web turning unit 550, (iv) hinge and release-reseal system unit 560, (v) die cutting unit 570, (vi) combination slitting and/or plow folding, and web turning unit 575, (vii) nip roller web joining unit 580, (viii) final die cutting and waste matrix removal unit 585, and (ix) final re-wind unit 590, as will now each be further described.

It is to be understood that press 510 is also selectively capable of providing a variable number of stations as described relative to the press of FIG. 3.

In an example of construction of three-ply labels 10 in this single web process, a single web 520 is supplied in a conventional roll form to press 510 at unwind unit 530, and in a lengthwise machine direction M thereto. Of course, web 520 may comprise any suitable in-line web-like materials, as aforedescribed.

Unwind unit 530 passes web 520 to multi-graphic printing unit 540 where selected multiple graphics are printed on the web. Web 520 then advances to combination graphic, varnish, and web turning unit 550, where each side of the web may be selectively coated with graphics and varnish. Web 520 then advances to hinge and release-reseal system unit 560, where, as aforedescribed, a release-reseal system is provided.

After passing from unit 560, web 520 advances to die cutting unit 570 where the web is die cut to create a "window" in the web. The "window" represents that portion of the area of the intermediate ply or plies which needs to be removed in order to reduce them to the desired size for inclusion inside the label 10. It is to be understood that, alternatively or in combination, the aforedescribed selective die cutting and waste matrix removal method may be utilized. Web 520 is then passed to slitting and/or plow folding unit 575, where a slitting and/or plow folding operation is performed. It is to be appreciated that these die cutting and slitting and/or plow folding operations create multiple plies from a single web. Web 520 having the multiple plies then advances to nip roller web joining unit 580, where it is compressed, and folds therein are creased.

Web 520 then passes to final die cutting and waste matrix removal unit 585 where a waste matrix resulting from the final die cutting is removed.

After the process of stripping away the waste matrix, web 520 becomes an array of individual labels as aforedescribed.

It will be appreciated and understood that web 520 might have a conventional pressure-sensitive laminate construction. Likewise, web 520 could be in a form of a film material web whereupon a pressure-sensitive transfer adhesive with a liner (not illustrated) is introduced just before the web reaches the nip roller (unit 580) thereby creating a pressure-sensitive laminate label construction.

Figure 7:
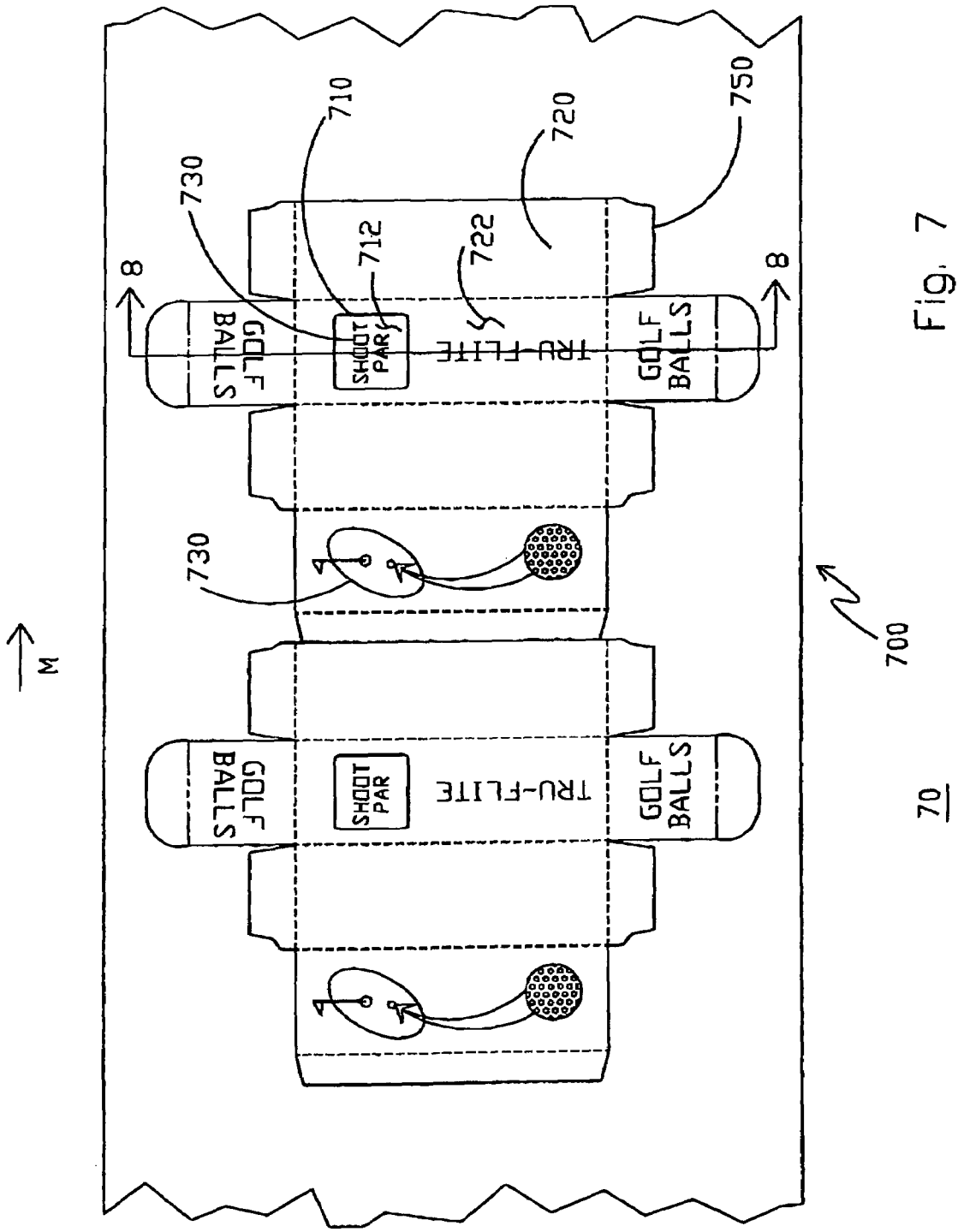
FIG. 7 is a plan view illustration of a fragment of an exemplary combined web including discrete elements combined with primary substrates, suitable for manufacture by an alternate process embodiment of the present invention.
Figure 8:
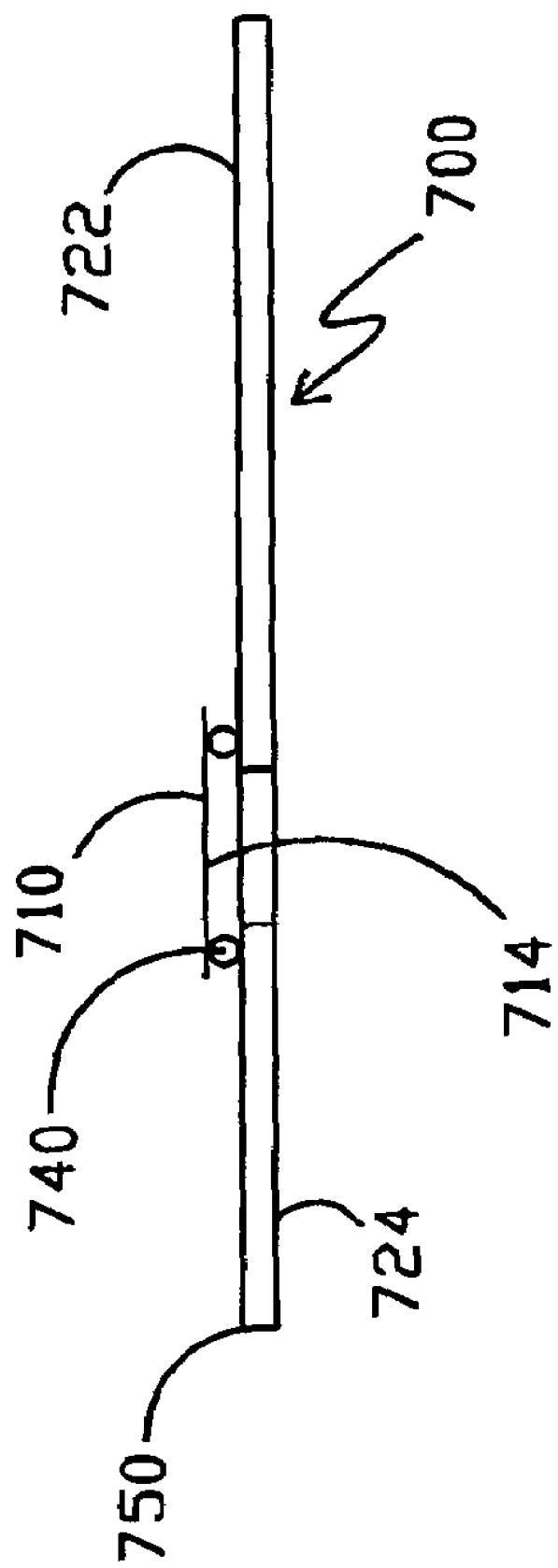
FIG. 8 is a cross-sectional view of the web of FIG. 7, taken along line 8—8.

In FIGS. 7–12, an alternate process embodiment in which discrete elements are combined with primary substrates, such as film-covered windows within carton stock material, is disclosed. Specifically, FIGS. 7–8 show plan and cross-sectional views, respectively, of a fragment of an exemplary combined web 70 including individual final products 700. Final or finished articles or products 700 are defined by discrete elements 710 combined with primary substrates 720. Discrete elements 710 have a front surface 712 and a back surface 714. Primary substrates 720 have a front surface 722 and a back surface 724. As may be discerned from the figures and the following description, which are not meant to be limiting in any way, windowed golf ball cartons are depicted as exemplary finished products 700. Exemplary final or finished products 700 are shown in flat (knockdown) or pre-folded form (i) as comprising discrete elements 710 (e.g., film) combined with (fixed to) primary substrates 720 (e.g., printed cardboard or carton stock), and (ii) prior to being separated from web 70 (the cardboard or carton stock). Of course, it is understood by those skilled in the art that the cartons are then sent in a flat form (commonly, in stacks) to a folder/gluer. The combining of discrete elements 710 with primary substrates 720 may be accomplished by way of a suitable adhesive 740.

Multi-part articles or finished products 700 also may include graphics 730 printed on substrates 720, and even selectively on elements 710 as may be desired. Products 700 are preferably cut about their perimeters 750 to (i) in full die cut fashion to separate products 700 from web 70 (in so-called "cut-and-stack" fashion as is known in the art) or (ii) to form perforations (making web 70 suitable for use from a supply roll provided by re-winding as is known in the art), in response to a particular end user's needs.

Although not illustrated in FIGS. 7–8, graphics may, of course, also be provided selectively on back surfaces 714 and 724 of discrete elements 710 and primary substrates 720, respectively.

As disclosed in connection with earlier described process embodiments, primary substrates 720 may be provided by any suitable web- or sheet-like material that (i) meets physical and chemical compatibility requirements, (ii) has desired aesthetic attributes, and (iii) has an acceptable material cost. Discrete elements 710 may be characterized as being secondary, or added, to primary substrates 720, and are generally smaller than dimensions of perimeter 750 of primary substrates 720. Likewise, although traditionally transparent as window coverings, as shown in the illustrative example, discrete elements 710, as well as primary substrates 720, could comprise any materials which are capable of being utilized in traditional printing and converting processes, with such materials including but not being limited to: paper; film; polypropylene; polyethylene; polyester; polyvinylchloride; polystyrene; ethylene vinyl acetate; foil; board; foam; textiles; cork; metal, reflective, or magnetic material; and even wood.

It is to be particularly understood that discrete elements 710 may also comprise certain "samples" or relatively thin adhered matter (e.g., without limitation, a towelette, a Radio Frequency Identification (RFID) tag, or a carpet sample or paint chip to name a few). Additionally, primary substrates 720 could also comprise a laminated, multi-ply construction. Further, although not depicted, an over- laminate ply may be provided to cover all or a portion of discrete elements 710 as well as primary substrates 720.

In regard to the combining of the discrete elements with the primary substrates in accordance with the process of the present invention, certain criteria regarding their construction will be described. Those skilled in the art will recognize that the processes described herein are presented as examples and are not intended to be limiting with regard to the scope of the invention in any way.

Figure 9:
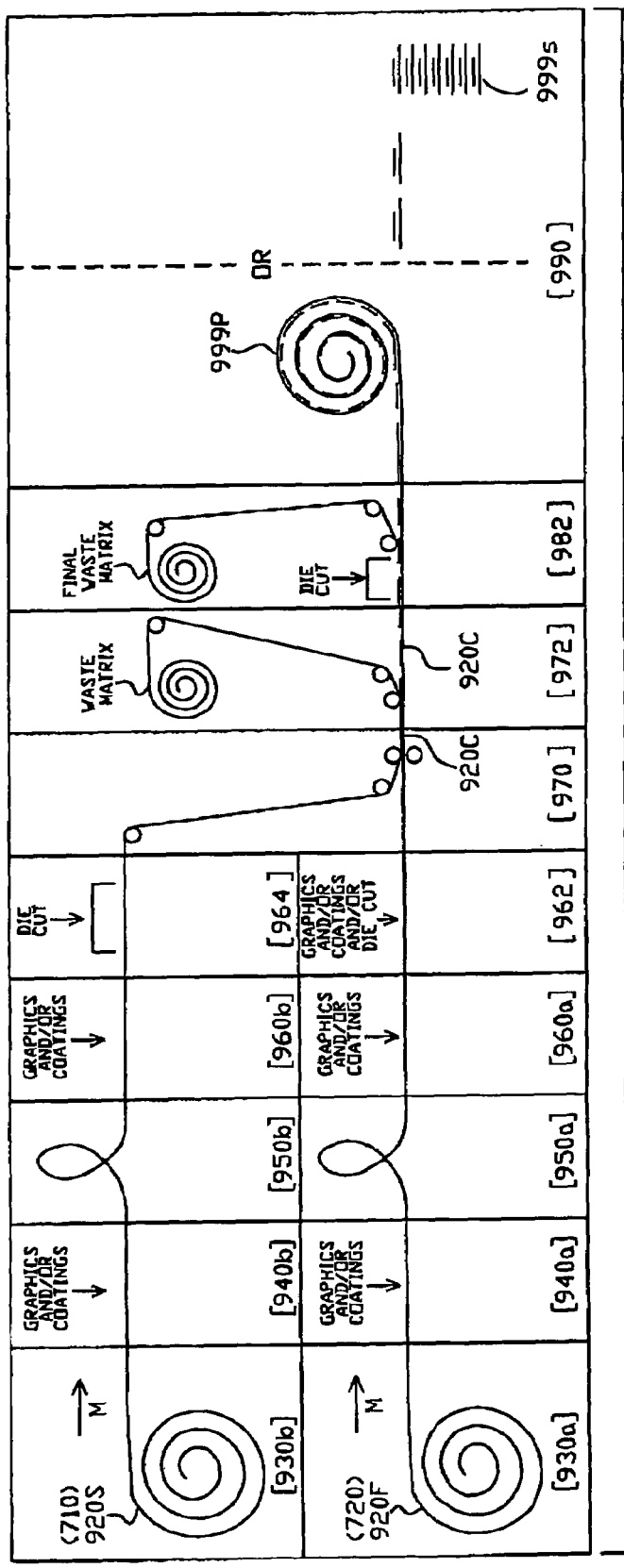
FIG. 9 is a schematic diagram of a preferred method of manufacturing discrete elements combined with primary substrates, such as illustrated in FIG. 7.
Figure 11:
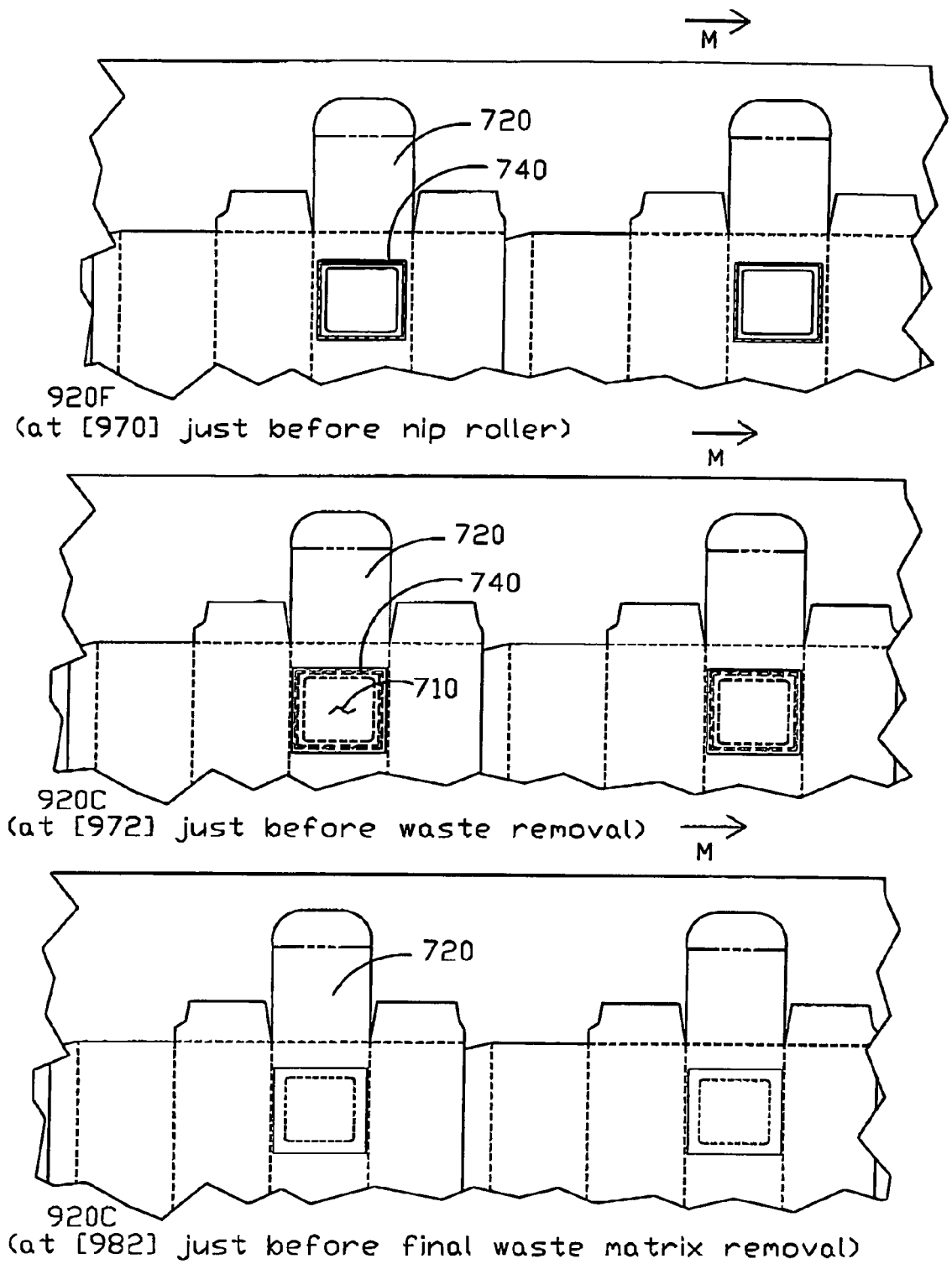
FIG. 11 is an illustration of progressive views of an enlarged fragment of an exemplary web of discrete elements combined with primary substrates created in accordance with the manufacturing method of the present invention.

Directing attention now to FIG. 9, there is depicted in schematic fashion an example of an in-line or modular web press manufacturing installation, generally 900, including multi-unit in-line printing and converting press 910, for mass or continuous production of, for example, the aforedescribed exemplary combined web 70 of FIGS. 7–8, including individual final products 700 defined by discrete elements 710 combined with primary substrates 720. As seen in FIG. 9, exemplary converting press 910 as depicted is configured to process first and second webs 920F and 920S respectively, which in turn provide substrates 720 and elements 710, respectively.

Multi-unit press 910 of installation 900 includes (i) unwind units 930a and 930b, (ii) first printing units 940a and 940b, (iii) web turning units 950a and 950b, (iv) second printing units 960a and 960b, (v) third printing and optional die cutting unit 962, (vi) first die cutting unit 964, (vii) first adhesive deposition and nip roller web joining unit 970, (viii) first waste matrix removal unit 972, (ix) second die cutting and waste matrix removal unit 982, and (x) final re-winding or sheeting unit 990, as will now each be further described in construction of the aforedescribed exemplary combined web 70 of FIGS. 7–8.

As with press 310, it is to be understood that press 910 may also take many forms and may be made selectively capable of providing a variable number of printing and converting stations for a desired application, including re-winding or sheeting. Several of the exemplary units 940–982 may be arranged in any desired order and, of course, units may also be added or removed from installation 900 as desired or required by process variations. As understood by those skilled in the printing arts, multi-unit press 910, like press 310, may be any suitable narrow- or wide-web platform press.

With continued reference to FIG. 9, and as an example of construction of combined web 70 as depicted in FIGS. 7–8 including individual final products 700 defined by discrete elements 710 combined with primary substrates 720, first web 920F (corresponding to primary substrates 720 in FIGS. 7–8) is supplied in a conventional roll form to press 910 at unwind unit 930a, and in a lengthwise machine direction M thereto. Second web 920S (corresponding to discrete elements 710 in FIGS. 7–8) is also preferably supplied in conventional roll form to press 910 at unwind unit 930b in lengthwise machine direction M. Webs 920F and 920S may be any suitable in-line web-like materials for primary substrates 720 and discrete elements 710, respectively, as has been described in detail.

Unwind units 930a–b pass webs 920F and 920S, respectively, to first printing units 940a and 940b, respectively, where selected graphics may be printed on the front surfaces of the webs. Webs 920F and 920S then advance to optional web turning units 950a–b, respectively, where the webs may be turned by way of any suitable turn-bar or like technique as known in the art for printing on their back surfaces if desired; such printing is then accomplished at second printing units 960a–b, respectively.

In the exemplary embodiment of the manufacture of windowed golf ball cartons, third printing and optional die cutting unit 962 is employed to cut or "slug" out shapes, creating window openings in primary substrates 720 corresponding to discrete elements 710 which cover the window openings, as is evident in FIG. 8.

As with previously described embodiments, an important advance in the process of this embodiment involves the selective die cutting of web 920S. Specifically, from second printing unit 960b, web 920S advances to a first die cutting unit 964 where web 920S is selectively die cut to define discrete element portions and a remaining waste portion therewithin, with, importantly, web 920S remaining intact. Critical print-to-print and cut-to-cut registration is maintained between the concurrently processed webs 920F and 920S, and ultimately final products 700, because web 920S remains intact after die cutting at unit 964. In this regard, with reference to FIGS. 10a and 10b, web 920S is held intact by uncut tabs 715T along die cut area 715D.

Referring again to FIG. 9, webs 920F and 920S then advance to first adhesive deposition and nip roller web joining unit 970 where they are adhesively joined or "married" in aligned print-to-print registration to form a combined web 920C (corresponding to web 70 in FIGS. 7–8). In this step, a suitable adhesive (not illustrated) is provided on a selected one of webs 920F and 920S, in a position corresponding to selected portions of the aforementioned discrete element portions in web 920S; the selected portions are determined with regard to window peripheries or the like or other considerations to the relevant web combination. Such marrying of webs 920F and 920S may then be accomplished by, for example, any suitable nip roller or web joining technique as known in the art. Combined web 920C then passes to waste matrix removal unit 972 where a waste matrix from the aforementioned remaining waste portion of web 920S (resulting from operation of first die cutting unit 964 as aforedescribed) is "stripped" and removed in any well-known waste matrix removal or stripping operation. The stripping operation, as will be appreciated by those skilled in the art, results from fracturing or otherwise forcefully severing the aforementioned minor uncut tabs 715T as the remaining waste portion from web 920S is pulled away. The stripping operation thus results in creation or combination of individual, discrete elements (710) with primary substrates (720) on combined continuous web 920C (carrying final products 700).

After the stripping process, combined web 920C passes to second die cutting and waste matrix removal unit 982, where the web is die cut and a final waste matrix is removed to define final products 700.

Although not illustrated, it is to be appreciated and understood that additional printing, laminating, and coating units could be provided between units 972 and 982 as may be desired. Further, additional webs (like 920S) could advantageously be introduced at this point to the process, and married or laminated to web 920C.

Web 920C then passes to final re-wind or, alternatively, sheeting unit 990 for, respectively, (i) re-winding into a finished press roll 999P carrying final products 700 (as shown, for example, in FIG. 11) or (ii) "cutting and stacking" (or "sheeting") web 920C into a finished stack 999S. As known to those skilled in the art, other final converting processes (e.g., "fan folding") may be employed.

As indicated above, it is to be appreciated and understood that the first die cutting step and reliable operation of first die cutting unit 964 are critical, to accurate creation in web 920S of defined discrete element portions and resulting discrete elements. Further, it is to be particularly appreciated that the aforedescribed technique of leaving web 920S intact immediately after the first die cutting operation creates a selected waste portion in the manufacturing method of the present invention that advantageously enables a completely in-line, single pass process to succeed. It is to be noted that in-line processes must maintain print-to-print and cut-to-cut registration, which is imperative when providing, for example, final products 700 to discriminating consumers, or generally large amounts of information on limited surface areas of products 700. It is to be particularly appreciated and emphasized that the aforedescribed step of removing the waste portion from the second web as a waste matrix from the combined web, effectively leaves behind on the combined web in-register and adhered discrete elements.

Of course, as with other process embodiments described herein, this process embodiment could employ and join additional webs providing additional substrates or discrete elements in the exemplary manner of processing described herein as will be evident to those skilled in the art.

The present invention, it is to be understood, provides several features that result from both the disclosed single-pass, in-line process for constructing multi-ply resealable labels, and for manufacturing discrete elements combined with primary substrates (or, in general, multi-part articles). As will be evident to and appreciated by those skilled in the art, these features include (compared to, e.g., prior art pick-and-place methods): increased or enhanced process control; decreased manipulation of separate parts, thereby decreasing process errors; higher running speeds; higher product reliability; improved registration; and an improved "indexing" capability of the second web relative to the first web, for material savings and efficiency.

The present invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, as well as materials, can be accomplished without departing from the scope of the invention itself.

For example, it will be appreciated that any of the aforedescribed graphics, coatings, materials, and release-reseal systems may be selectively provided in any suitable combination on labels constructed according to the present invention, for a particular desired use. Thus, in FIGS. 1–2, the relative positions of coatings 26 and 28 could be interchanged by way of corresponding modifications to, for example, press 310 in FIG. 3. Similarly, any of the aforedescribed graphics, coatings, and materials may be selectively provided in any suitable combination as well for the discrete elements combined with primary substrates constructed according to the present invention, for a particular desired use.

It is also to be understood in general that any suitable alternatives may be employed to provide the process for manufacturing multi-ply labels, as well as the process for manufacturing discrete elements combined with primary substrates, of the present invention.

Lastly, the choice, of course, of compositions, sizes, and strengths of various aforementioned components of the present invention are all a matter of design choice depending upon intended uses thereof.

What is claimed is:

1. A single-pass, inline process for creating multi-part articles by combining primary substrates in a first continuous web with discrete elements from a second continuous web, comprising steps of:
    (a) providing a first web which defines primary substrates, said first web having a front surface and a back surface;
    (b) providing a second web which defines a discrete element source material, said second web having a front surface and a back surface;
    (c) pre-cutting said second web to define, but not separate, discrete element portions and a waste portion, said second web remaining intact;
    (d) joining said first and said second webs in aligned relation in a manner which causes selected portions of said discrete element portions to adhere to selected portions of said primary substrates in said first web in a predetermined aligned registration to form multi-part articles; and
    (e) removing said waste portion of said second web from said combined web.

2. A process as in claim 1 comprising the step of final cutting said combined web to define final multi-part articles.

3. A process as in claim 1 wherein said first and said second webs are joined using an adhesive applied on a selected one of said first and said second webs, in a position corresponding to selected portions of said discrete element portions in said second web.

4. A process as in claim 2 wherein said first and said second webs are joined using an adhesive applied on a selected one of said first and said second webs, in a position corresponding to selected portions of said discrete element portions in said second web.

5. A process as in claim 1 wherein said waste portion of said second web is removed by continuous stripping.

6. A process as in claim 2 wherein said waste portion of said second web is removed by continuous stripping.

7. A process as in claim 3 wherein said waste portion of said second web is removed by continuous stripping.

8. A process as in claim 4 wherein said waste portion of said second web is removed by continuous stripping.

9. A process as in claim 1 wherein said first web is of a multi-ply construction.

10. A process as in claim 2 wherein said first web is of a multi-ply construction.

11. A process as in claim 2 wherein said final cutting step defines but does not separate said primary substrates from said first web and including the step of winding said first web on a roll for finished articles.

12. A process as in claim 2 wherein said final cutting step separates said primary substrates from said combined web, and including the step of stacking finished multi-part articles.

13. A process as in claim 1 wherein said discrete elements are smaller than said primary substrates.

14. A process as in claim 4 wherein said discrete elements are smaller than said primary substrates.

15. A process as in claim 1 including the step of pre-cutting said first web.

16. A process as in claim 1 including the step of applying graphics to selected portions of one or more of said surfaces of said first and said second webs prior to joining said first and said second webs.

17. A process as in claim 1 further comprising the step of laminating a third web over said combined web after the removal of said waste portion of said second web from said combined web.

18. A process as in claim 1 wherein said discrete elements carry an additional adhered article.

19. A single-pass, in-line process for manufacturing discrete elements combined with primary substrates, including steps of:
   (a) providing a first web which defines primary substrates, said first web having a front surface and a back surface;
   (b) providing a second web which defines a discrete element source material, said second web having a front surface and a back surface;
   c) cutting said second web to define discrete element portions and a waste portion;
   (d) providing adhesive on a selected one of said first and second webs, in a position corresponding to selected areas of said discrete element portions in said second web;
   (e) joining said first and second webs in aligned relation by said adhesive, to create a combined web;
   (f) removing said waste portion from said second web as a waste matrix from said combined web, thereby combining discrete elements with said primary substrates; and
   (g) cutting said combined web to define a final combination configuration.

20. A process as in claim 19, further comprising the step of laminating a third web over said combined web carrying said discrete elements.

21. The process of claim 19, wherein graphics are applied to selected portions of said front and back surfaces of said first and second webs prior to said step of joining said first and second webs.

22. A method of producing a plurality of multi-part articles from a plurality of continuous webs in a single-pass, inline process in which discrete elements cutout from one web are combined with defined parts from another web, comprising steps of:
   (a) pre-cutting at least one web to define, but not separate, discrete elements, and to define a waste portion, the web remaining intact;
   (b) joining webs in predetermined aligned registration, at least one of which is subjected to step (a); and
   (c) removing said waste portion created in step (a).

23. A single-pass, in-line process for creating multi-part articles by combining primary substrates in a first continuous web with discrete elements from a second continuous web, comprising steps of:
   (a) providing a first web which defines primary substrates, said first web having a front surface and a back surface;
   (b) providing a second web which defines a discrete element source material, said second web having a front surface and a back surface;
   (c) precutting said first web to create window openings in said primary substrates;
   (d) precutting said second web to define, but not separate, discrete element portions and a waste portion, said second web remaining intact;
   (e) joining said first and said second webs in aligned relation in a manner which causes selected portions of said discrete element portions to adhere to selected portions of said primary substrates in said first web in a predetermined aligned registration to form multi-part articles; and
   (f) removing said waste portion of said web from said combined web.

24. A process as in claim 23 comprising the step of final cutting said combined web to define final multi-part articles.

25. A process as in claim 23 including the step of applying graphics to selected portions of one or more of said surfaces of said first and said second webs prior to joining said first and said second webs.

26. A process as in claim 23 further comprising the step of laminating a third web over said combined web after the removal of said waste portion of said second web from said combined web.

* * * * *